(12) United States Patent
Harmon et al.

(10) Patent No.: US 11,858,399 B2
(45) Date of Patent: Jan. 2, 2024

(54) DEPLOYABLE VEHICLE DESK

(71) Applicant: Ford Global Technologies, LLC, Dearborn, MI (US)

(72) Inventors: Michael John Harmon, Westland, MI (US); Ryan Wayne Warner, Ann Arbor, MI (US); Jesse Rene Diephuis, West Bloomfield, MI (US); Andrew Brand, Bloomfield Township, MI (US); Andrew Smith, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

(21) Appl. No.: 17/490,394

(22) Filed: Sep. 30, 2021

(65) Prior Publication Data
US 2023/0097623 A1     Mar. 30, 2023

(51) Int. Cl.
*B60N 3/00*     (2006.01)

(52) U.S. Cl.
CPC .................................. *B60N 3/002* (2013.01)

(58) Field of Classification Search
CPC ........ B60N 3/002; B60N 3/001; A47B 5/006; B60R 7/06
USPC ...................................................... 296/37.12
See application file for complete search history.

(56) References Cited

U.S. PATENT DOCUMENTS

| | | | | |
|---|---|---|---|---|
| 2,161,275 A * | 6/1939 | Betts | ...................... | B60N 3/002 108/45 |
| 2,382,011 A * | 8/1945 | William | .................. | B60N 3/002 224/564 |
| 2,568,102 A * | 9/1951 | Weiss | ...................... | B60N 3/002 108/45 |
| 2,616,775 A * | 11/1952 | Nesbitt | .................. | B60N 3/002 108/45 |
| 2,626,194 A * | 1/1953 | Clower | .................. | B60N 3/002 108/45 |

(Continued)

FOREIGN PATENT DOCUMENTS

| | | | | |
|---|---|---|---|---|
| DE | 102012009675 A1 * | 8/2013 | ............... | B60R 7/06 |
| DE | 102018211852 B4 | 3/2020 | | |

(Continued)

OTHER PUBLICATIONS

Mayeur, Gerard. FR 2990665 A1, "Storage compartment", Machine translation, ip.com, Nov. 22, 2013 (Year: 2013).*

(Continued)

*Primary Examiner* — Amy R Weisberg
*Assistant Examiner* — Wenwei Zhuo
(74) *Attorney, Agent, or Firm* — Vichit Chea; Price Heneveld LLP (57) ABSTRACT

A vehicle includes a dashboard having a lower portion that defines a recess. The lower portion has a bottom surface and a recess surface. The bottom surface is adjacent to the recess surface, and the recess surface of the lower portion defines the recess. The vehicle also includes a desk operably coupled to the dashboard and movable between an undeployed position and a deployed position. In the undeployed position, the desk is received within the recess and an underside surface of the desk is generally flush with the bottom surface of the lower portion of the dashboard. In the deployed position, the position of the desk is further vehicle-rearward than the position of the desk in the undeployed position.

6 Claims, 5 Drawing Sheets

(56) References Cited

U.S. PATENT DOCUMENTS

| | | | |
|---|---|---|---|
| 2,657,107 A | 10/1953 | Bisaga et al. | |
| 3,606,447 A * | 9/1971 | Ryding | B60R 7/088 |
| | | | 224/483 |
| 9,428,118 B1 * | 8/2016 | Rawlinson | B60N 3/001 |
| 10,583,740 B2 | 3/2020 | Ory | |
| 2016/0297368 A1 * | 10/2016 | Huebner | B60R 7/04 |
| 2016/0375811 A1 * | 12/2016 | Bendewald | B60N 3/002 |
| | | | 701/49 |
| 2019/0241205 A1 | 8/2019 | Toyama et al. | |

FOREIGN PATENT DOCUMENTS

| | | | |
|---|---|---|---|
| DE | 102020112228 A1 * | 11/2021 | |
| FR | 2990665 A1 * | 11/2013 | B60N 3/002 |
| WO | 2021063809 A1 | 4/2021 | |

OTHER PUBLICATIONS

Brueggemann-Heuter et al. DE 102012009675 A1, machine translation, Aug. 8, 2013 (Year: 2013).*

* cited by examiner

DEPLOYABLE VEHICLE DESK

FIELD OF THE DISCLOSURE

The present disclosure generally relates to a deployable desk for a vehicle. More specifically, the present disclosure relates to a desk that can be deployed from a recess defined by a dashboard of a vehicle.

BACKGROUND OF THE DISCLOSURE

Vehicle interiors often include dashboards that support a variety of vehicle components, such as a human machine interface, or steering wheel assembly.

SUMMARY OF THE DISCLOSURE

According to a first aspect of the present disclosure, a vehicle includes a dashboard having a lower portion that defines a recess. The lower portion has a bottom surface and a recess surface. The bottom surface is adjacent to the recess surface, and the recess surface of the lower portion defines the recess. The vehicle also includes a desk operably coupled to the dashboard and movable between an undeployed position and a deployed position. In the undeployed position, the desk is received within the recess and an underside surface of the desk is generally flush with the bottom surface of the lower portion of the dashboard. In the deployed position, the position of the desk is further vehicle-rearward than the position of the desk in the undeployed position.

Embodiments of the first aspect of the present disclosure can include any one or a combination of the following features:
- the position of the desk in the deployed position is further vehicle-downward than the position of the desk in the undeployed position;
- the desk includes an upper work surface that faces generally vehicle-upward in the deployed position, wherein a plane of the upper work surface in the deployed position is substantially parallel to the plane of the upper work surface in the undeployed position;
- the lower portion of the dashboard further comprises a top surface opposite the bottom surface, and a side surface that extends between the top and bottom surfaces, wherein the side surface is adjacent to the recess surface;
- the desk further comprises an upper work surface opposite the underside surface, and a desk side surface extending between the upper work surface and the underside surface, wherein, in the undeployed position of the desk, the desk side surface is generally flush with the side surface of the lower portion of the dashboard;
- the desk is operably coupled to the dashboard via a plurality of pivot members, each of the plurality of pivot members having a first end that is pivotably coupled to the dashboard and a second end that is pivotably coupled to the desk, wherein the desk is operable between the undeployed and deployed positions via pivotal movement of the first end of each of the plurality of pivot members relative to the dashboard and pivotal movement of the second end of each of the plurality of pivot members relative to the desk;
- the first end of each of the plurality of pivot members is pivotably coupled to the recess surface of the lower portion of the dashboard; and
- the plurality of pivot members comprises a first pivot member, a second pivot member, a third pivot member, and a fourth pivot member.

According to a second aspect of the present disclosure, a vehicle includes a dashboard and a desk operably coupled to the dashboard via a plurality of pivot members. Each of the plurality of pivot members has a first end that is pivotably coupled to the dashboard and a second end that is pivotably coupled to the desk. Further, the desk is operable to move from an undeployed position to a deployed position via pivotal movement of the first end of each of the plurality of pivot members relative to the dashboard and pivotal movement of the second end of each of the plurality of pivot members relative to the desk.

Embodiments of the second aspect of the present disclosure can include any one or a combination of the following features:
- the position of the desk in the deployed position is further vehicle-rearward than the position of the desk in the undeployed position;
- the position of the desk in the deployed position is further vehicle-downward than the position of the desk in the undeployed position;
- the dashboard defines a recess, and the desk is received within the recess in the undeployed position and moves out of the recess as the dashboard moves to the deployed position;
- the dashboard comprises a lower portion that defines a recess, the lower portion having a bottom surface and a recess surface, wherein the bottom surface is adjacent to the recess surface, and the recess surface of the lower portion defines the recess, and wherein the desk is received within the recess in the undeployed position;
- an underside surface of the desk is generally flush with the bottom surface of the lower portion in the undeployed position of the desk;
- the lower portion of the dashboard further comprises a top surface opposite the bottom surface, and a side surface that extends between the top and bottom surfaces, wherein the side surface is adjacent to the recess surface; and
- the desk further comprises an upper work surface opposite the underside surface, and a desk side surface extending between the upper work surface and the underside surface, wherein, in the undeployed position of the desk, the desk side surface is generally flush with the side surface of the lower portion of the dashboard.

According to a third aspect of the present disclosure, a vehicle includes a dashboard having a lower portion that defines a recess. The lower portion has a recess surface that defines the recess and a lower portion adjacent to the recess surface. The vehicle also includes a desk operably coupled to the dashboard via a plurality of pivot members. Each of the plurality of pivot members has a first end that is pivotably coupled to the dashboard and a second end that is pivotably coupled to the desk. The desk is operable to move between an undeployed position and a deployed position. In the undeployed position, the desk is received within the recess and an underside surface of the desk is generally flush with the bottom surface of the lower portion of the dashboard. In the deployed position, the position of the desk is further vehicle-rearward than the position of the desk in the undeployed position. Further, the desk is operable to move between the undeployed and deployed positions via pivotal movement of the first end of each of the plurality of pivot members relative to the dashboard and pivotal movement of the second end of each of the plurality of pivot members relative to the desk.

Embodiments of a third aspect of the present disclosure can include any one or a combination of the following features:

the position of the desk in the deployed position is further vehicle-downward than the position of the desk in the undeployed position;

the desk includes an upper work surface that faces substantially vehicle-upward in the deployed position, wherein a plane of the upper work surface in the deployed position is substantially parallel to the plane of the upper work surface in the undeployed position; and the first end of each of the plurality of pivot members is pivotably coupled to the recess surface of the lower portion of the dashboard.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-5, a vehicle 10 is disclosed. The vehicle 10 includes a dashboard 14 that has a lower portion 20 that defines a recess 28. The lower portion 20 includes a bottom surface 34 and a recess surface 38. The bottom surface 34 is adjacent to the recess surface 38, and the recess surface 38 defines the recess 28. A desk 48 is operably coupled to the dashboard 14. The desk 48 is movable between an undeployed position, wherein the desk 48 is received within the recess 28 and an underside surface 52 of the desk 48 is generally flush with the bottom surface 34 of the lower portion 20 of the dashboard 14, and a deployed position, wherein the position of the desk 48 is further vehicle-rearward than the position of the desk 48 in the undeployed position.

Figure 1:
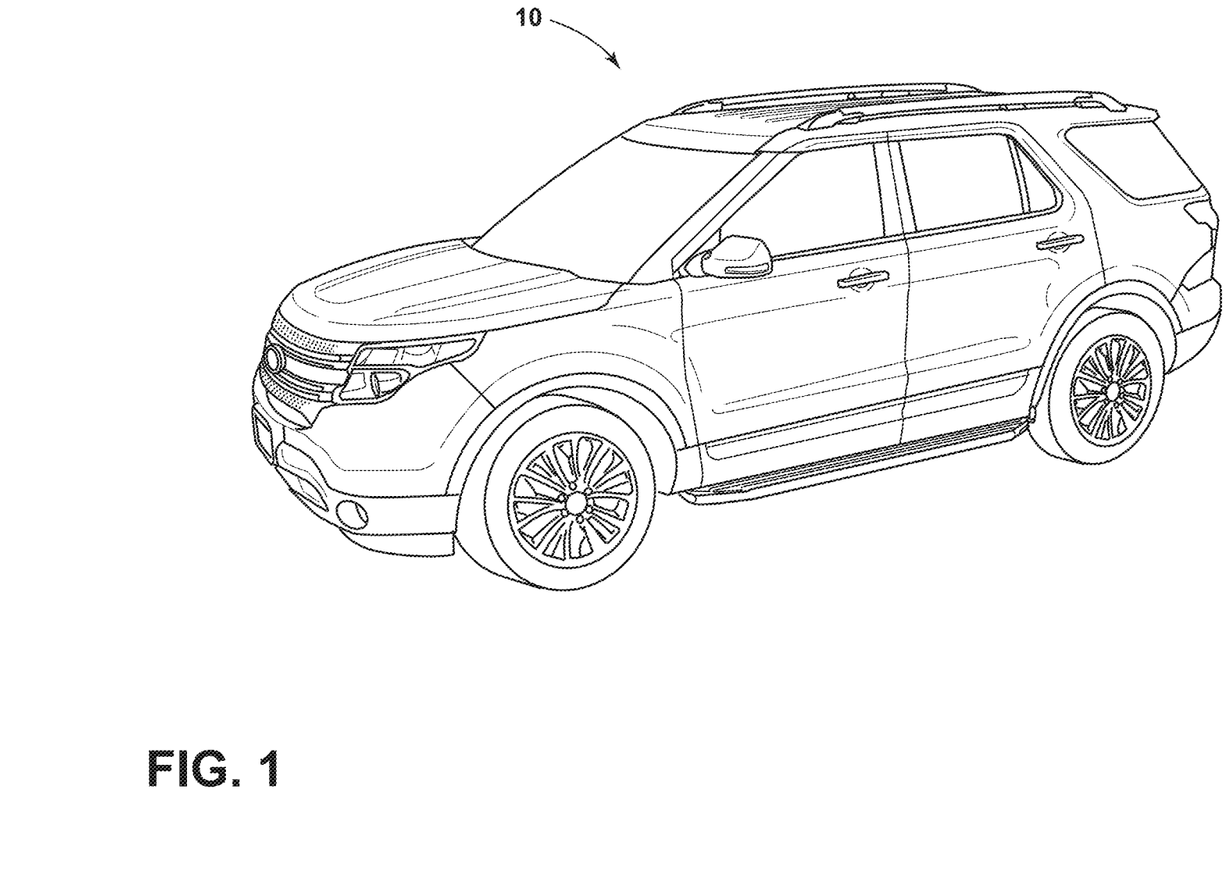
FIG. 1 is a side perspective view of a vehicle, according to one embodiment.
Figure 2:
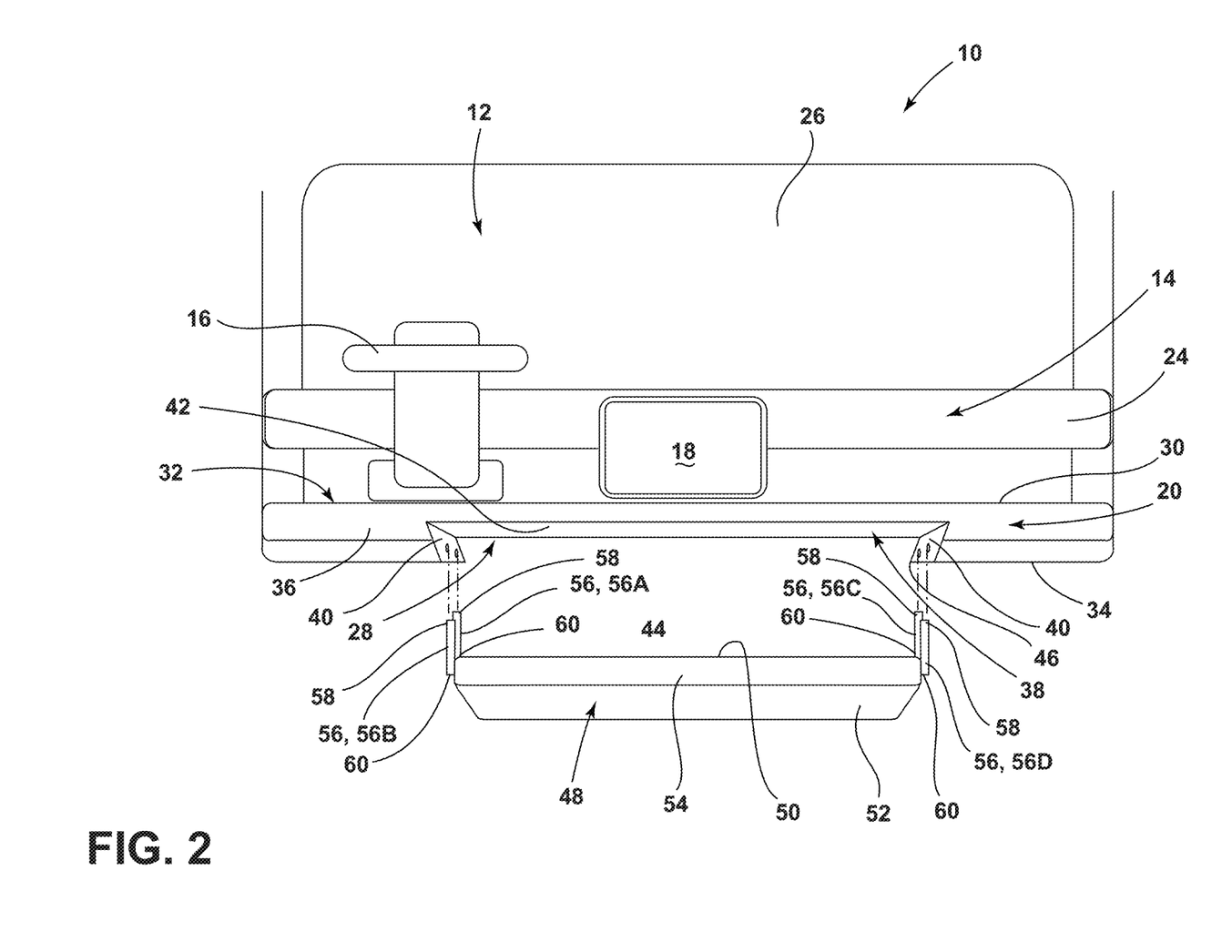
FIG. 2 is an exploded view of a portion of a vehicle interior, illustrating a dashboard that defines a recess and a desk that is configured to be coupled to the dashboard and received within the recess, according to one embodiment.

Referring now to FIGS. 1 and 2, the vehicle 10 includes a vehicle interior 12. The dashboard 14 is positioned within the vehicle interior 12, as illustrated in FIG. 2. In various embodiments, the dashboard 14 may be positioned at a vehicle-forward end of the vehicle 10. The dashboard 14 may have a variety of vehicle components coupled thereto. For example, a steering wheel assembly 16 and a center stack display 18 may be coupled to the dashboard 14 in some embodiments, as illustrated in FIG. 2.

Referring now to FIG. 2, the dashboard 14 may include a lower portion 20. The lower portion 20 of the dashboard 14 may be proximate to a foot well 22 of the vehicle 10. In some embodiments, at least a part of the lower portion 20 of the dashboard 14 may define the foot well 22 of the vehicle 10. The dashboard 14 may further include an upper portion 24. The upper portion 24 of the dashboard 14 is vehicle-upward of the lower portion 20 of the dashboard 14. In the embodiment illustrated in FIG. 2, the upper portion 24 of the dashboard 14 is adjacent to a windshield 26 of the vehicle 10. It is contemplated that the lower and upper portions 20, 24 of the dashboard 14 may be adjacent to and/or coupled to each other, in some embodiments. In some implementations, the lower and upper portions 20, 24 of the dashboard 14 may be integrally coupled to each other, such that the lower and upper portions 20, 24 of the dashboard 14 are portions of a single unitary body that forms the dashboard 14 and/or a portion thereof. In the embodiment illustrated in FIG. 2, the lower portion 20 of the dashboard 14 is positioned below the steering wheel assembly 16 and the center stack display 18 that is mounted to the dashboard 14, and the upper portion 24 of the dashboard 14 is positioned adjacent to the bottom of the windshield 26 of the vehicle 10. Various implementations are contemplated.

Referring still to FIG. 2, the dashboard 14 may define the recess 28. In some embodiments, the lower portion 20 of the dashboard 14 may define the recess 28. In the embodiment illustrated in FIG. 2, the lower portion 20 of the dashboard 14 includes a top surface 30 that extends vehicle-rearward from the adjacent portion of the dashboard 14 that extends upward therefrom. As such, the top surface 30 generally forms a shelf 32. As further illustrated in FIG. 2, the lower portion 20 includes a bottom surface 34 opposite the top surface 30 and a side surface 36 that extends between the top and bottom surfaces 30, 34. The lower portion 20 further includes the recess surface 38 that is adjacent to the bottom and side surfaces 34, 36 of the lower portion 20. The recess surface 38 defines the recess 28 of the dashboard 14. The top surface 30 faces generally vehicle-upward, and the bottom surface 34 faces generally vehicle-downward. As illustrated in FIG. 2, the recess surface 38 includes recess surface side walls 40 that generally face each other and an upper wall 42 that extends between the recess surface side walls 40. The upper wall 42 faces generally vehicle-downward.

In various embodiments, the recess 28 defined by the dashboard 14 faces generally vehicle-downward. In other words, an opening 44 to the recess 28 is positioned at the vehicle-downward end of the recess 28, and the recess 28 extends upward from the opening 44 to the upper wall 42, which defines the recess 28. In the embodiment illustrated in FIG. 2, a peripheral rim 46 of the recess 28 that defines the opening 44 to the recess 28 extends along the bottom surface 34 of the lower portion 20 of the dashboard 14 and the side surface 36 of the lower portion 20 of the dashboard 14.

Figure 3:
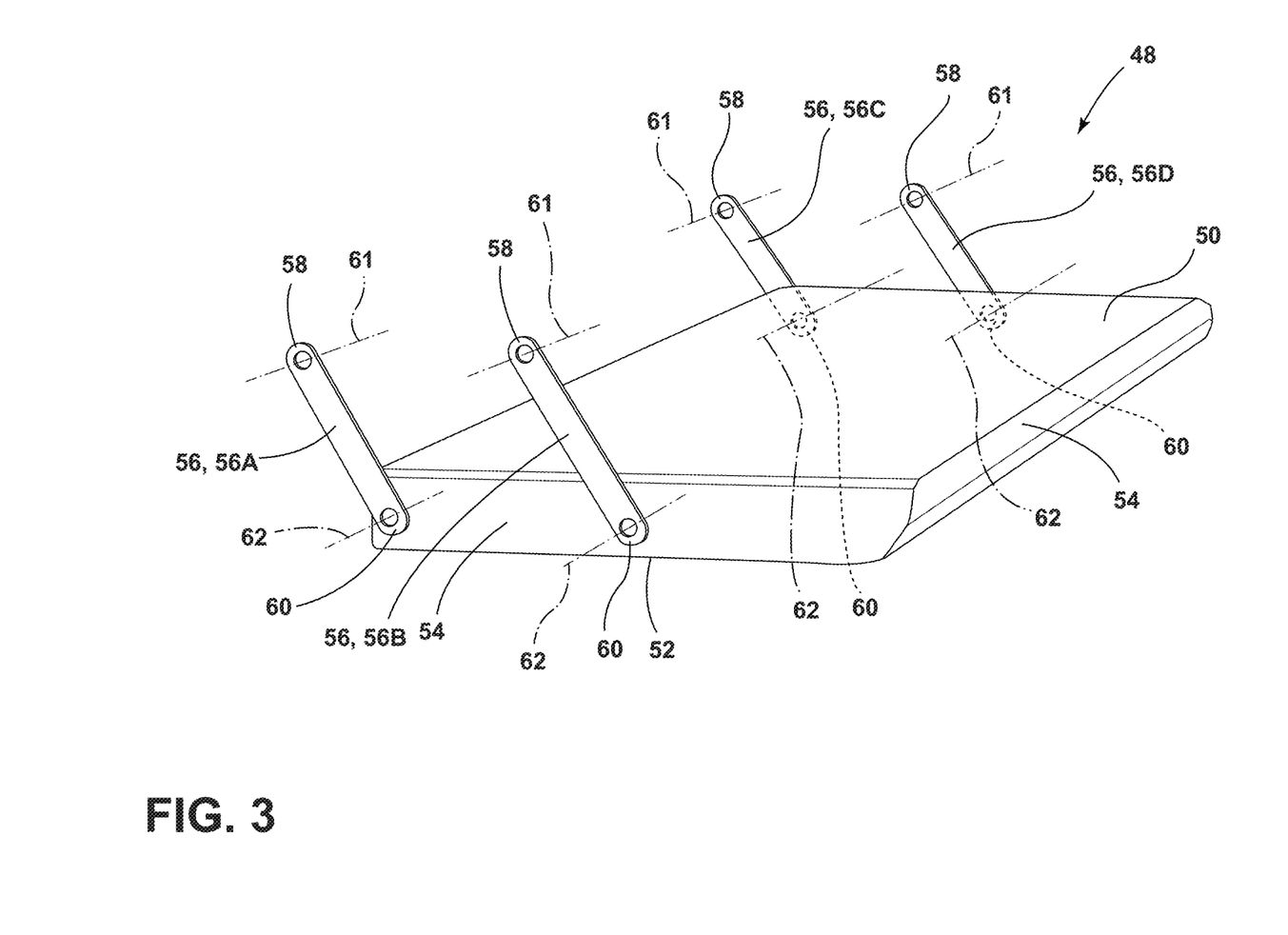
FIG. 3 is a top perspective view of the desk, illustrating a plurality of pivot members pivotably coupled to the desk, according to one embodiment.

Referring now to FIGS. 2 and 3, in various embodiments, the desk 48 is operably coupled to the dashboard 14 of the vehicle 10. In the embodiments illustrated in FIGS. 2 and 3, the desk 48 includes an upper work surface 50, an underside surface 52 that is opposite the upper work surface 50, and a desk side surface 54 that extends between the upper work surface 50 and the underside surface 52 of the desk 48. In various embodiments, the underside surface 52 of the desk 48 faces generally vehicle-downward and the upper work surface 50 of the desk 48 faces generally vehicle-upward. The upper work surface 50 of the desk 48 may be configured to be utilized by a user as a table, in some embodiments. A variety of types of desks 48 having various shapes and directionally-oriented surfaces are contemplated.

Figure 5:
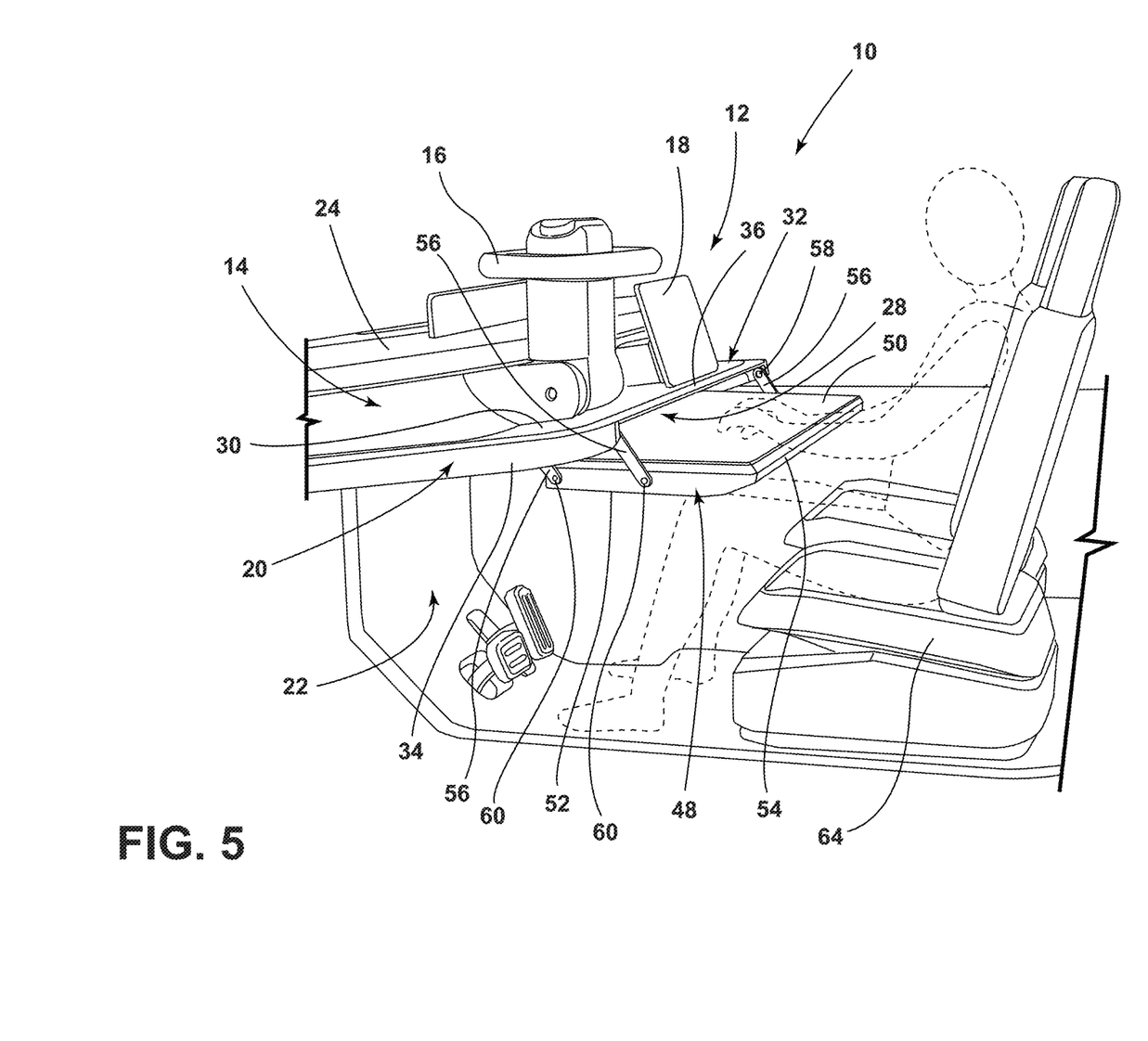
FIG. 5 is a side perspective view of the vehicle interior, illustrating the desk extended outside of the recess defined by the dashboard in a deployed position, according to one embodiment.

Referring to FIGS. 2, 3, and 5, in some embodiments, the desk 48 may be coupled to the dashboard 14 via a plurality of pivot members 56. Each of the plurality of pivot members 56 may include a first end 58 that is pivotably coupled to the dashboard 14, and a second end 60 that is pivotably coupled to the desk 48. In some embodiments, the first end 58 of each of the plurality of pivot members 56 may be pivotably coupled to the recess surface 38 of the lower portion 20 of the dashboard 14 that defines the recess 28. For example, as illustrated in FIG. 2, the first end 58 of each of the plurality of pivot members 56 is configured to be coupled to one of the recess surface side walls 40 of the recess surface 38. As further illustrated in FIGS. 2 and 3, in some embodiments, the second end 60 of each of the plurality of pivot members 56 may be pivotably coupled to the desk side surface 54 of the desk 48. It is contemplated that the first end 58 of each of the plurality of pivot members 56 may be coupled to various portions of the dashboard 14, and the second end 60 of each of the plurality of pivot members 56 may be pivotably coupled to various portions of the desk 48, in some implementations. Further, it is contemplated that the desk 48 may be operably coupled to the dashboard 14 in a variety of manners, in various embodiments.

In the embodiment illustrated in FIG. 2, the plurality of pivot members 56 includes a first pivot member 56A, a second pivot member 56B, a third pivot member 56C, and a fourth pivot member 56D. As viewed in FIG. 2, the first and second pivot members 56A, 56B are pivotably coupled to the desk side surface 54 on the left side of the desk 48. The first pivot member 56A is pivotably coupled to the desk 48 at a position that is vehicle-forward of the position that the second pivot member 56B is pivotably coupled to the desk 48. Further, the third and fourth pivot members 56C, 56D are pivotably coupled to the desk side surface 54 on the right side of the desk 48, as viewed in FIG. 2. The third pivot member 56C is pivotably coupled to the desk 48 at a position that is vehicle-forward of the position that the fourth pivot member 56D is pivotably coupled to the desk 48. Each of the plurality of pivot members 56 is operable to pivot relative to the dashboard 14 about a first end pivot axis 61, and each of the plurality of pivot members 56 is operable to pivot relative to the desk 48 about a second end pivot axis 62. In some embodiments, the first end pivot axis 61 of one of the plurality of pivot members 56 may be substantially coaxial with the first end pivot axis 61 of one or more other pivot members 56 of the plurality of pivot members 56. Further, the second end pivot axis 62 of one of the plurality of pivot members 56 may be substantially coaxial with the second end pivot axis 62 of one or more other pivot members 56 of the plurality of pivot members 56. For example, in the embodiment illustrated in FIG. 3, the first end pivot axis 61 of the first pivot member 56A is substantially coaxial with the first end pivot axis 61 of the third pivot member 56C, and the second end pivot axis 62 of the first pivot member 56A is substantially coaxial with the second end pivot axis 62 of the third pivot member 56C. Further, the first end pivot axis 61 of the second pivot member 56B is substantially coaxial with the first end pivot axis 61 of the fourth pivot member 56D, and the second end pivot axis 62 of the second pivot member 56B is substantially coaxial with the second end pivot axis 62 of the fourth pivot member 56D.

Figure 4:
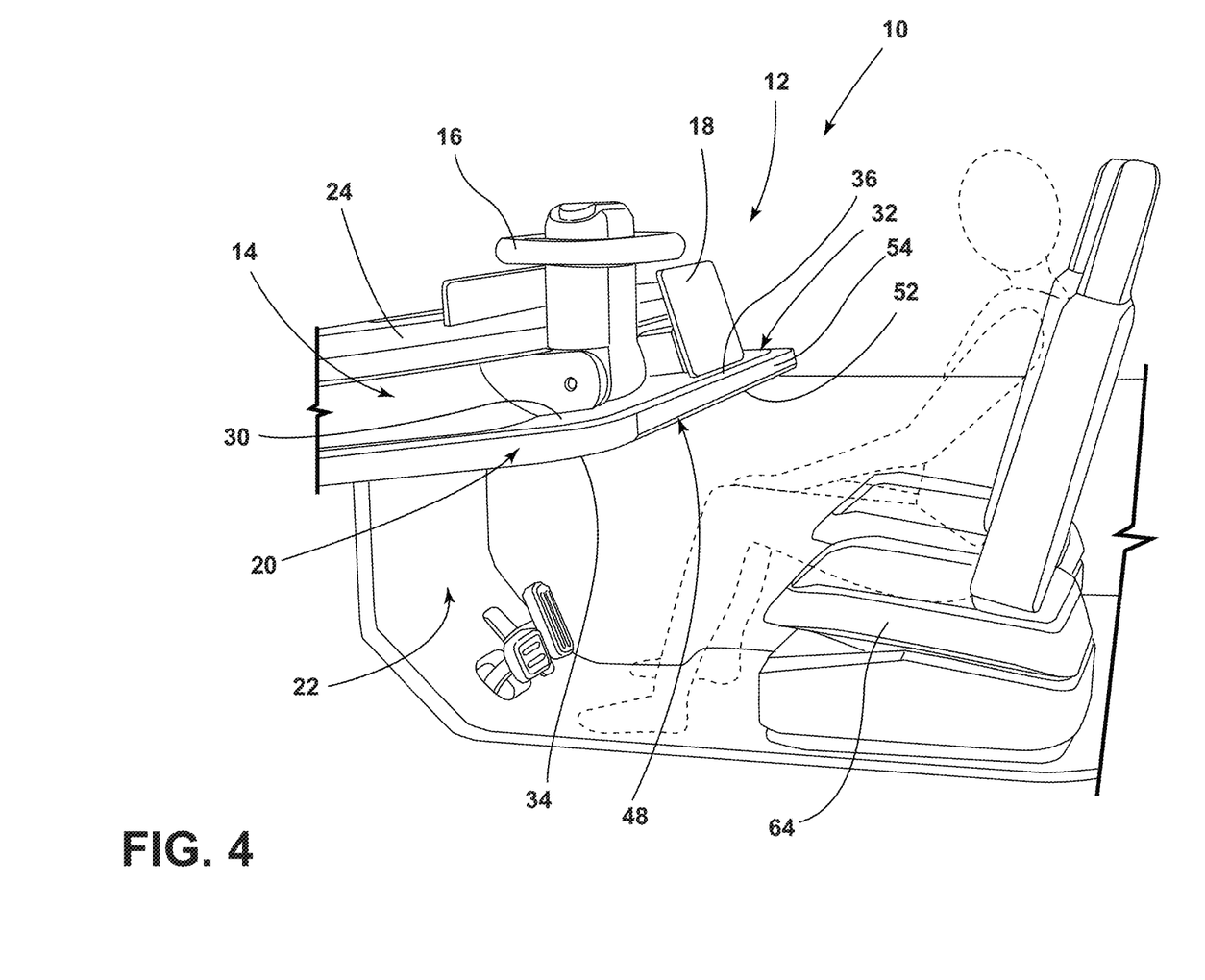
FIG. 4 is a side perspective view of the vehicle interior, illustrating the desk received within the recess defined by the dashboard in an undeployed position, according to one embodiment.

Referring now to FIGS. 4 and 5, in various embodiments, the desk 48 is operably coupled to the dashboard 14 and movable between an undeployed position and a deployed position. In various embodiments, the desk 48 moves relative to the dashboard 14 between the undeployed and deployed positions. In some embodiments, the position of the desk 48 in the deployed position may be further vehicle-downward and/or vehicle-rearward than the position of the desk 48 in the undeployed position. For example, in reference to FIGS. 4 and 5, the position of the desk 48 in the deployed position (FIG. 5) is vehicle-rearward and vehicle-downward of the position of the desk 48 in the undeployed position (FIG. 4).

Referring still to FIGS. 4 and 5, in some embodiments, the desk 48 is received within the recess 28 defined by the dashboard 14 while in the undeployed position. In some embodiments, the underside surface 52 of the desk 48 may be substantially flush with the bottom surface 34 of the lower portion 20 of the dashboard 14 while the desk 48 is received within the recess 28 in the undeployed position. In some embodiments, the desk side surface 54 is substantially flush with the side surface 36 of the lower portion 20 of the dashboard 14 in the undeployed position of the desk 48. In various embodiments, surfaces may be flush with each other when the surfaces are coplanar with each other. It is contemplated that curved surfaces may be flush with each other in addition to coplanar surfaces being flush with each other. For example, two curved surfaces that are aligned with each other at adjacent edges may be flush with each other. In the embodiment illustrated in FIG. 4, the desk 48 is in the undeployed position, such that the underside surface 52 of the desk 48 is substantially flush with the bottom surface 34 of the lower portion 20 of the dashboard 14, and the desk side surface 54 is substantially flush with the side surface 36 of the lower portion 20 of the dashboard 14.

In some embodiments, the upper work surface 50 of the desk 48 may face a first direction in the deployed position, and the upper work surface 50 of the desk 48 may face a second direction in the undeployed position, wherein the first and second directions are substantially the same direction. For example, in some embodiments, the upper work surface 50 of the desk 48 may face substantially vehicle-upward in the deployed position and the undeployed position. In some embodiments, wherein the upper work surface 50 faces substantially vehicle-upward in the deployed position, a plane of the upper work surface 50 in the deployed position is substantially parallel to the plane of the upper work surface 50 in the undeployed position.

Referring still to FIGS. 4 and 5, in some embodiments, wherein the desk 48 is coupled to the dashboard 14 via the plurality of pivot members 56, the desk 48 may be operable to move between the undeployed position and the deployed position via pivotal movement of the first end 58 of each of the plurality of pivot members 56 relative to the dashboard 14 and pivotal movement of the second end 60 of each of the plurality of pivot members 56 relative to the desk 48. In the embodiment illustrated in FIGS. 4 and 5, the desk 48 swings vehicle-downward and vehicle-rearward from the undeployed position (FIG. 4) to the deployed position (FIG. 5) via pivotal movement of the first end 58 of each of the plurality of pivot members 56 relative to the dashboard 14 and pivotal movement of the second end 60 of each of the plurality of pivot members 56 relative to the desk 48. It is contemplated that the desk 48 may be selectively maintained in the undeployed position, the deployed position, and/or one or more positions therebetween via at least one of a variety of retention features (not shown).

In an exemplary embodiment of the vehicle, the desk 48 is operably coupled to the dashboard 14 by the plurality of pivot members 56 that are operable to pivot relative to both the dashboard 14 and the desk 48. In operation of the exemplary embodiment, initially, the desk 48 is in the undeployed position, such that the underside surface 52 of the desk 48 is substantially flush with the bottom surface 34 of the lower portion 20 of the dashboard 14, and the desk side surface 54 is substantially flush with the side surface 36 of the lower portion 20 of dashboard 14. A user seated within a seating assembly 64 facing the dashboard 14 pulls the dashboard 14 vehicle-rearward. The force exerted on the dashboard 14 by the user causes the first end 58 of each of the plurality of pivot members 56 to pivot relative to the dashboard 14, and the second end 60 of each of the plurality of pivot members 56 to pivot relative to the desk 48, such that the desk 48 swings from the undeployed position to the deployed position, as illustrated in FIG. 5. The user then utilizes the upper work surface 50 of the desk 48 as a table.

The vehicle 10 of the present disclosure may provide a variety of advantages. First, the desk 48 being stowable within the recess 28 defined by the dashboard 14 may conveniently allow a user to configure the vehicle interior 12 in different manners for different circumstances. Second, the underside surface 52 and the desk side surface 54 being flush with the bottom surface 34 of the dashboard 14 and the side surface 36 of the dashboard 14, respectively, in the undeployed position of the desk 48 may contribute to a streamlined aesthetic. Third, the desk 48 may provide a work surface for seated occupants of the vehicle 10 to perform work or rest items upon in the deployed position of the desk 48.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle, comprising:
  a dashboard having a recess surface that defines a recess and that includes a first recess surface side wall and a second recess surface side wall that generally faces the first recess surface side wall; and
  a desk having a desk side surface and being operably coupled to the dashboard via a plurality of pivot members, each of the plurality of pivot members having a first end that is pivotably coupled to at least one of the first and second recess surface side walls of the dashboard and a second end that is pivotably coupled to the desk side surface, wherein the desk is operable to move from an undeployed position to a deployed position via pivotal movement of the first end of each of the plurality of pivot members relative to the dashboard and pivotal movement of the second end of each of the plurality of pivot members relative to the desk;
  wherein the dashboard comprises:
    a lower portion that defines the recess, the lower portion having a bottom surface and the recess surface, wherein the bottom surface is adjacent to the recess surface, and the recess surface of the lower portion defines the recess, and wherein the desk is received within the recess in the undeployed position;
  further wherein an underside surface of the desk is generally flush with the bottom surface of the lower portion in the undeployed position of the desk;
  further wherein the lower portion of the dashboard further comprises:
    a top surface opposite the bottom surface; and
    a side surface that extends between the top and bottom surfaces, wherein the side surface is adjacent to the recess surface; and
  further wherein the desk further comprises:
    an upper work surface opposite the underside surface; and
    a desk side surface extending between the upper work surface and the underside surface, wherein, in the undeployed position of the desk, the desk side surface is generally flush with the side surface of the lower portion of the dashboard.

2. The vehicle of claim 1, wherein the position of the desk in the deployed position is further vehicle-rearward than the position of the desk in the undeployed position.

3. The vehicle of claim 2, wherein the position of the desk in the deployed position is further vehicle-downward than the position of the desk in the undeployed position.

4. The vehicle of claim 1, wherein the desk is received within the recess in the undeployed position and moves out of the recess as the desk moves to the deployed position.

5. The vehicle of claim 1, wherein the plurality of pivot members comprises:
- a first pivot member;
- a second pivot member;
- a third pivot member; and
- a fourth pivot member.

6. The vehicle of claim 1, wherein the upper work surface faces generally vehicle-upward in the deployed position, and wherein a plane of the upper work surface in the deployed position is substantially parallel to the plane of the upper work surface in the undeployed position.

* * * * *